(No Model.)
H. G. FALKE.
REMOVABLE CAKE COVER.
No. 422,015. Patented Feb. 25, 1890.
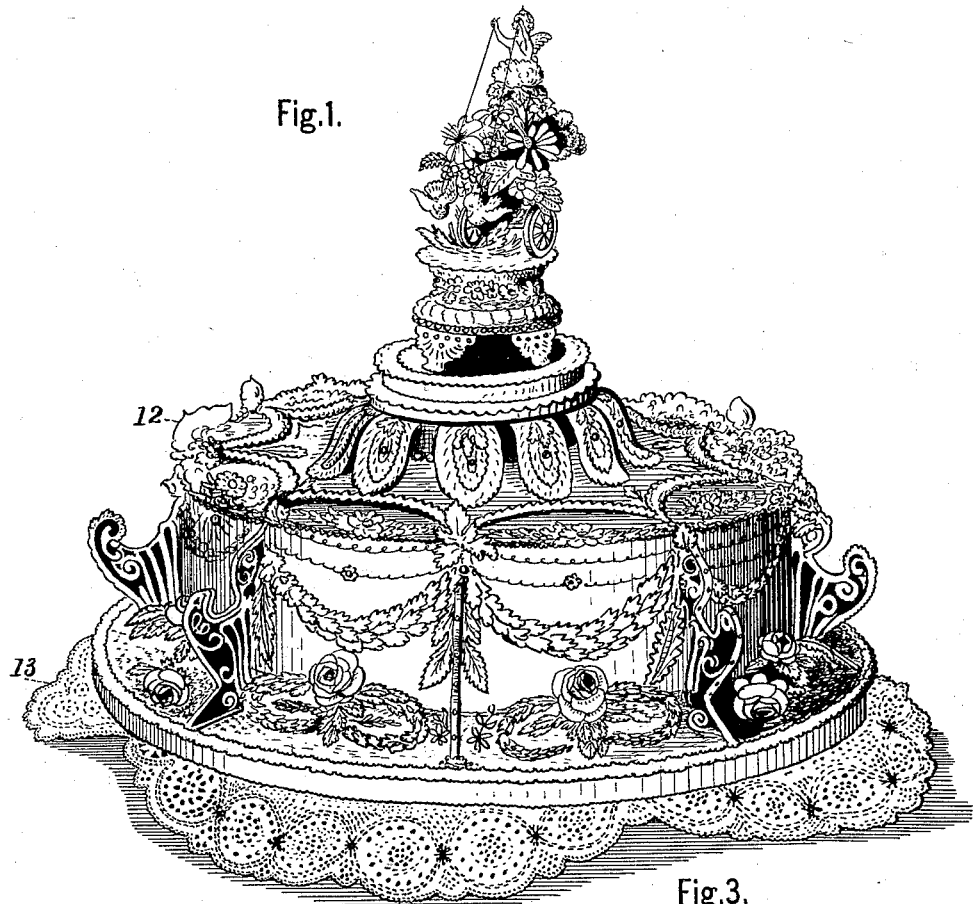
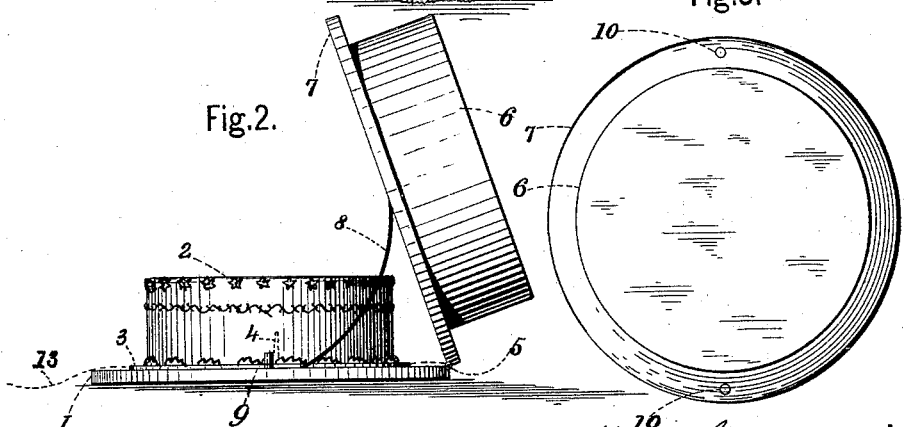
Witnesses.
Harriet Johnson.
Robert A. Geary
Henry G. Falke, Inventor.
By James Sangster,
Attorney.

UNITED STATES PATENT OFFICE.

HENRY G. FALKE, OF BUFFALO, NEW YORK.

REMOVABLE CAKE-COVER.

SPECIFICATION forming part of Letters Patent No. 422,015, dated February 25, 1890.

Application filed May 11, 1889. Serial No. 310,371. (No model.)

*To all whom it may concern:*

Be it known that I, HENRY G. FALKE, a citizen of the United States, residing in Buffalo, in the county of Erie and State of New York, have invented certain new and useful Improvements in Removable Cake-Covers, of which the following is a specification.

My invention relates to a new and useful improved removable frosted covering for cakes, whereby the cake may be cut without cutting or in any way injuring the appearance of the frosted covering, all of which will be fully and clearly hereinafter described and claimed, reference being had to the accompanying drawings, in which—

Figure 1 is a perspective view of suitable frosted covering complete. Fig. 2 is a side elevation showing the covering before the frosting has been applied, showing it also open, so as to expose the cake within it, and also certain details of construction. Fig. 3 represents a top plan view.

In Fig. 1 I have shown a suitable design; but, as the design is not a part of this invention, any design that taste or skill may devise may be used.

In Fig. 2, 1 represents the base upon which the cake 2 is placed, preferably upon a thin circular plate 3, secured by a pin 4, (shown in dotted lines,) passing up through the center into the cake, so that it may be turned upon the pin 4 as it is being cut.

To the base 1 is secured by a hinge 5 the cover 6, having a surrounding base-flange 7, upon which any suitable ornamental frosting is placed, and two silk or other cords 8 to prevent the cover from going back too far when opened sufficiently to get at the cake. When the cover is closed, these cords or tapes 8 fold within it and are out of sight.

To insure the cover fitting exactly in its proper place, the base 1 is provided with two upwardly-projecting pins 9, and in the base-flange 7 of the cover are two correspondingly-located holes 10, which pass over the pins 9 when the cover is closed.

To make the frosting 12 (shown in Fig. 1) adhere securely to the cover 6, it is coated inside and out with a coating of gelatine or any well-known adhesive material, so that the frosting (being moist when put on) adheres rigidly to it. The frosting that is used for this purpose is the ordinary frosting employed for ornamenting cakes, and may be made in any well-known way. If desired, the hinges 5 may be dispensed with and the cover removed entirely from the base when it is required to cut the cake, after which it may be returned to its place.

The base and cover are preferably made of wood; but it may be made of sheet metal or any suitable material adapted for the purpose.

Before the cake is put in place a cover of lace 13 or other suitable covering is placed over the base 1, entirely concealing it from view, (see Fig. 1, also dotted lines 13, Fig. 2,) and the interior of the cover may be lined with satin or other equivalent ornamenting material. A cake preserved in this way under cover will keep in good condition for a long time without in any way injuring the ornamental frosted portion.

When the frosting is placed directly upon the cake, it soon loses its pure white color and becomes yellow by absorbing the coloring matter therefrom. One of the objects of my invention is to avoid this objection by placing the ornamental or frosted portion directly upon a removable cover of some suitable material adapted to receive it, instead of placing it directly upon the cake. I have shown a round cover and base; but these portions may be made square, oval, or in any other form desired, the object being to cover the cake with a removable ornamental frosted cover.

Heretofore the ornamental or frosted portion of a cake has been destroyed by the cutting of the same, and the appearance of the cake is often injured by the breaking of the frosted portion during the operation of cutting. By means of my invention the ornamental or frosted portion, which is made in exact imitation of a cake, may be preserved and its pure white color retained for a great length of time, so that it may be used many times over again, and may even be preserved for use for wooden, tin, and silver weddings.

I claim as my invention—

A removable covering for cakes, consisting of a base 1, a removable cover 6, having a surrounding base 7, a coating of adhesive material, and an ornamental covering consisting of cake-frosting, substantially as described.

HENRY G. FALKE.

Witnesses:
 JAMES SANGSTER,
 EDWARD H. BAUER.